United States Patent [19]

Hirt

[11] Patent Number: 4,704,154
[45] Date of Patent: Nov. 3, 1987

[54] SUPPORTING MEANS FOR A BAFFLE OF A GLASSWARE FORMING MACHINE

[75] Inventor: Walter Hirt, Buelach, Switzerland

[73] Assignee: Emhart Industries, Inc., Farmington, Conn.

[21] Appl. No.: 910,108

[22] Filed: Sep. 19, 1986

[30] Foreign Application Priority Data

Sep. 21, 1985 [GB] United Kingdom ................ 8523371

[51] Int. Cl.⁴ .............................................. C03B 9/36
[52] U.S. Cl. ....................................... 65/233; 65/261; 65/307; 65/323
[58] Field of Search ................ 65/229, 233, 234, 261, 65/263, 307, 323

[56] References Cited

U.S. PATENT DOCUMENTS

| 3,158,391 | 11/1964 | Carmi et al. | 65/323 X |
| 3,189,427 | 6/1965 | Schirm | 65/307 |
| 3,347,653 | 10/1967 | Carmi et al. | 65/307 |
| 3,871,856 | 3/1975 | Trahan | 65/261 |
| 4,453,964 | 6/1984 | Parkell | 65/234 X |

FOREIGN PATENT DOCUMENTS 283870 6/1928 United Kingdom ................ 65/261

Primary Examiner—Arthur Kellogg
Attorney, Agent, or Firm—Spencer T. Smith

[57] ABSTRACT

The supporting means for a baffle used to close a mould of a glassware forming machine comprises an arm (12) mounted for vertical movement and for movement about a vertical axis. A support (14) is mounted on the arm and a baffle holder (28) is mounted on the support. The baffle holder is mounted on the support for limited vertical movement relative thereto against the action of resilient means (32) and also for limited movement in a horizontal plane.

1 Claim, 1 Drawing Figure

U.S. Patent     Nov. 3, 1987     4,704,154
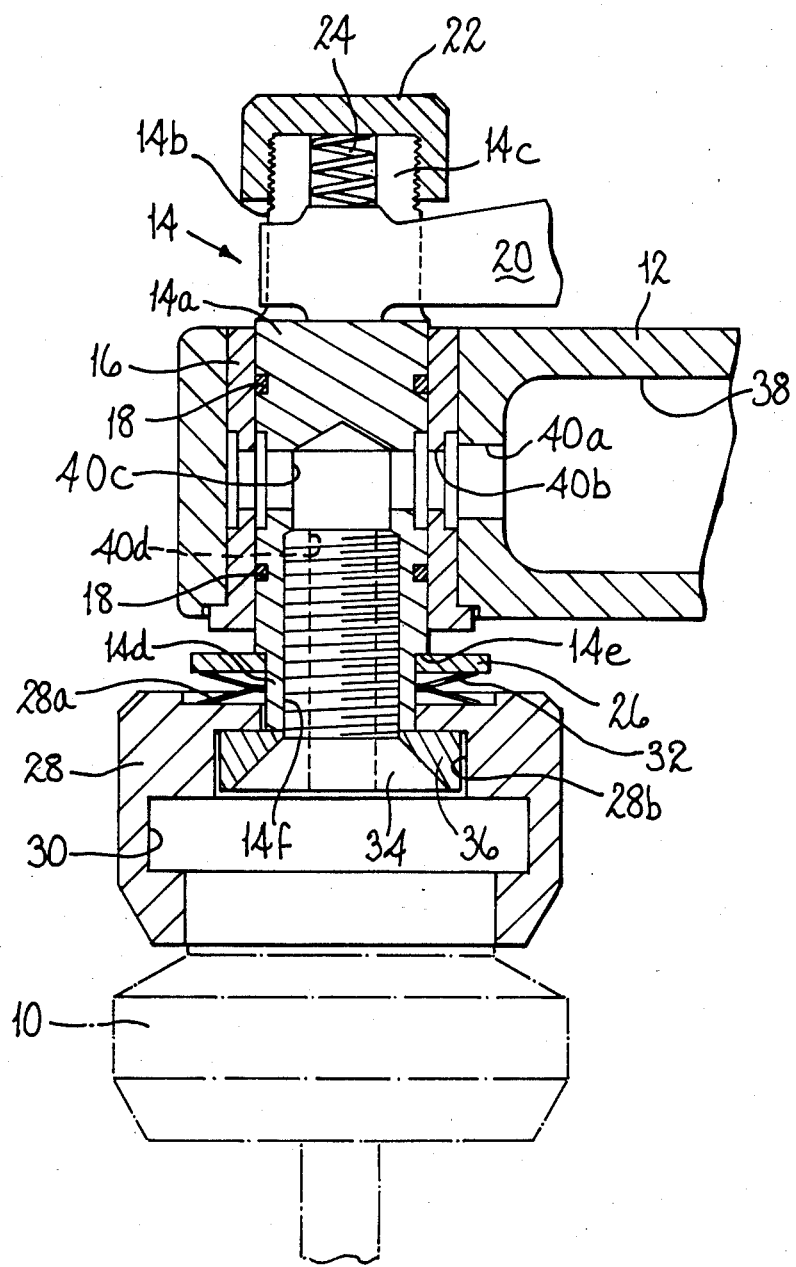

SUPPORTING MEANS FOR A BAFFLE OF A GLASSWARE FORMING MACHINE

BACKGROUND OF THE INVENTION

This invention is concerned with supporting means for a baffle used to close the mould of a glassware forming machine.

In a glassware forming machine of the so-called "individual section" type, the need arises to move a mould closure member, known as a baffle, between an out-of-the-way position thereof and one or more operative positions thereof in which the baffle is in alignment with an opening at the top of a mould cavity of a mould of the machine. When the machine is carrying out the so-called press-blow process, the baffle is moved from its out-of-the-way position to a position on top of the mould in which it closes the opening of the mould cavity. Glass is then pressed upwardly against the baffle and the remainder of the mould to shape a parison which is subsequently blown to the shape of a finished glass article. The baffle is then returned to its out-of-the-way position to allow removal of the parison from the mould. When the glassware forming machine is carrying out the so-called blow-blow process, the baffle is first moved from its out-of-the-way position to a position on top of a funnel on top of the mould. The funnel serves to guide a gob of molten glass into the mould cavity and the baffle is then positioned on top of the funnel. Air is blown downwardly into the mould cavity through the baffle to force the glass downwardly in the mould into contact with a plunger therein. The baffle it then returned to its out-of-the-way position so that the funnel can be removed. The baffle is then moved out of its out-of-the-way position and positioned on top of the mould to complete the mould cavity in which the molten glass is blown into the shape of a parison. The baffle is then returned to its out-of-the-way position to allow removal of the parison from the mould for subsequent blowing into the shape of a finished glass article.

Conventional moving means for moving a baffle in an individual section type machine comprises a piston and cylinder assembly having a vertically extending piston rod which projects in both directions from the piston. One end portion of the piston rod carries a horizontally extending arm on which the baffle is supported. The other end of the piston rod carries a cam which is engaged in a spiral cam track. The arrangement is such that, when the piston and cylinder assembly is operated, the piston rod moves vertically causing the baffle to also move vertically. As this movement takes place, the cam track causes the piston rod to turn about its longitudinal axis thereby swinging the arm and the baffle about the axis. The baffle is thus moved in a movement which has a rotary component about the vertical axis of the piston rod and a linear component in a vertical direction. The rotary component moves the baffle into and out of alignment with the mould while the linear component moves the baffle towards or away from the mould.

In a typical glassware forming machine of the individual section type, the baffle is supported by supporting means therefor which comprises the aforementioned arm which is mounted for movement vertically and about a vertical axis, a support mounted on the arm, and a baffle holder mounted on the support. Typically, two or more baffles are supported by supports mounted on the same arm. The holders are formed integrally with the supports and support the baffles by means of a bayonet type fitting. The supports are typically able to move vertically relative to the arm to a small extent and are acted upon by equalising means in the form of pivotally mounted links which serve to equalise the force applied to each support when the arm is moved into an operative position thereof. Thus, when the baffles mounted on an arm seat against adjacent moulds approximately equal pressure is applied between each baffle and its associated mould. Thus the baffles are able to move to a limited extent vertically relative to the arm on which they are supported.

Because the force applied to the baffles is transmitted along a horizontally extending arm, there is a tendency in practice for the arm to bend in a vertical plane. This bending causes the baffles which are mounted at different distances from the end of the arm which is secured to the piston rod to be moved horizontally by different amounts and also vertically by different amounts. This causes baffles to wear unevenly where they contact the mould and also causes similar wear to the mould. This wear causes expensive repairs especially as both mould and baffle are provided with hard metal coats. Furthermore, misalignment of the baffle with the mould causes seams to be formed in the moulded parison. These seams are a source of weakness in the parison and in the finished glass article and lead to rejection of articles.

It is another object of the present invention to provide supporting means for a baffle in which the baffle is able to move to accommodate movements caused by bending of the arm.

BRIEF DESCRIPTION OF THE INVENTION

The invention provides supporting means for a baffle used to close a mould of a glassware forming machine, the supporting means comprising an arm mounted for movement vertically and about a vertical axis, a support mounted on the arm, and a baffle holder mounted on the support, the baffle holder being mounted on the support for limited vertical movement relative to the support against the action of resilient means and also for limited movement in a horizontal plane relative to the support.

In supporting means according to the last preceding paragraph, the baffle holder is able to move relative to the support so that in addition to the vertical movement of the support relative to the arm the baffle holder and hence the baffle can float to find an aligned position with the mould both in a vertical direction and also in a horizontal plane.

Preferably, the baffle holder is supported by the head of a screw which is threadedly received in a vertical passage in the support, and an air passage passes through the arm, the support, and the screw to enter the baffle. Thus, a supply of air for pressing the glass downwardly in the mould in the blow-blow process can be conveniently supplied.

BRIEF DESCRIPTION OF THE DRAWINGS

There now follows a detailed description, to be read with reference to the accompanying drawing, of supporting means which are illustrative of the invention. It is to be understood that the illustrative supporting means has been selected for description by way of example and not of limitation of the invention.

The drawing is a vertical cross-sectional view taken through the illustrative supporting means.

DETAILED DESCRIPTION OF PREFERRED EMBODIMENT OF THE INVENTION

The illustrative supporting means is for a baffle 10 used to close a mould (not shown) of a glassware forming machine of the individual section type. The illustrative supporting means comprises an arm 12 of conventional construction and conventionally mounted for movement vertically and about a vertical axis. The illustrative supporting means also comprises two supports 14 (only one shown in the drawing) which are mounted on the arm 12.

Each support 14 comprises a cylindrical body portion 14a which is mounted in a bushing 16 set in the arm 12, with its longitudinal axis arranged vertically. Two piston rings 18 are set in the portion 14a and serve to stabilise the portion 14a in the bushing 16. An upper portion 14b of the support 14 extends above the arm 12 and has a vertically-extending slot 14c therein in which an end portion of an equalising arm 20 is received. Above the equalising arm 20 the portion 14b is screw threaded and receives a cap 22. A spring 24 acts between the cap and the equalising bar 20. The equalising bar 20 is of conventional construction, having end portions engaging the two supports 14 and being pivoted in the centre (not shown) so that the equalising bar acts to equalise the pressure applied to the two supports 14. The support 14 is slidable vertically relative to the arm 12 through the bushing 16 to a limited extent determined by the equalising bar 20.

A portion 14c of the support 14 extends beneath the arm 12 and is of reduced diameter relative to the portion 14a so that the support 14 has a step 14e therein. A thrust washer 26 is received on the portion 14d and rests against the step 14e.

The illustrative supporting means also comprises a baffle holder 28 in which the baffle 10 can be supported in a bayonet fitting 30. The baffle holder 28 is mounted on the support 14 for limited vertical movement relative to the support 14 against the action of resilient means provided by a group of cup springs 32 which act betweeen an upper surface 28a of the holder 28 and a lower surface of the thrust washer 26. The holder 28 is supported by the head of a screw 34 which is threadedly received in a vertical passage 14f which extends upwardly into the support 14. The head of the screw 34 is received in a washer 36 which is a loose fit in a recess 28b in the holder 28. The holder rests on the washer 36, and is urged thereagainst by the cup springs 32. The holder 28 is thus also mounted for limited movement in a horizontal plane relative to the support 14 to an extent limited by the loose fit of the washer 36 in the recess 28b.

In order to supply air to the baffle, the so-called settle blow air from the blow-blow process, air is supplied in conventional manner to a chamber 38 in the arm 12. An air passage passes through the arm 12 into the support 14 and passes centrally through the screw 34 to enter the baffle. The air passage has a portion 40a in formed in the arm 12, a portion 40b extending horizontally in the bushing 16 and the support 14 communicating with a portion 40a, a vertical portion 40c extending vertically in the support 14 coaxially with the recess 14f and communicating with the portion 40b, and a vertically extending portion 40d, passing centrally through the centre of the screw 34 and communicating with the portion 40c.

I claim:

1. A support for a baffle used to close a mold of a glassware forming machine, the supporting means comprising
   arm means,
   a vertically oriented cylindrical support carried by said arm means,
   a reduced diameter portion defined at the bottom of said support,
   a thrust washer received by said reduced diameter portion and adapted to abut against the remaining portion of said support,
   cup spring means received on said reduced diameter portion beneath said thrust washer,
   said cylindrical support having a threaded hole extending upwardly from the bottom thereof,
   screw means threadedly received by said threaded hole, said screw means having an upper beveled surface,
   a washer located intermediate said beveled surface and the end of said cylindrical portion, said washer having a lower beveled surface mating with said upper screw surface so that said washer will be maintained in coaxial relation with said screw, and
   a baffle holder having an opening through which said reduced diameter portion can pass and a recess communicating with said opening for receiving said washer, said baffle opening and said baffle recess being selectively sized so that said baffle can move a limited amount in a horizontal direction,
   the top surface of said baffle holder being selectively located so that said cup spring means will be compressively located between said thrust washer and said baffle when said washer is located against said reduced diameter portion so that said baffle holder can be displaced vertically relative to said support.

* * * * *